United States Patent
Liu et al.

(10) Patent No.: US 11,850,659 B2
(45) Date of Patent: Dec. 26, 2023

(54) HIGH ENTROPY ALLOY POWDER FOR LASER CLADDING AND APPLICATION METHOD THEREOF

(71) Applicant: KUNMING UNIVERSITY OF SCIENCE AND TECHNOLOGY, Kunming (CN)

(72) Inventors: Hongxi Liu, Kunming (CN); Jingzhou Liu, Kunming (CN); Xuanhong Hao, Kunming (CN); Yingnan Di, Kunming (CN); Jianquan Lin, Kunming (CN)

(73) Assignee: KUNMING UNIVERSITY OF SCIENCE AND TECHNOLOGY, Yunnan Province (CN)

( * ) Notice: Subject to any disclaimer, the term of this patent is extended or adjusted under 35 U.S.C. 154(b) by 96 days.

(21) Appl. No.: 17/486,062

(22) Filed: Sep. 27, 2021

(65) Prior Publication Data
US 2022/0097133 A1     Mar. 31, 2022

(30) Foreign Application Priority Data
Sep. 29, 2020   (CN) .......................... 202011052429.7

(51) Int. Cl.
*B22F 1/054*     (2022.01)
*B22F 1/107*     (2022.01)
(Continued)

(52) U.S. Cl.
CPC .............. *B22F 1/054* (2022.01); *B22F 1/107* (2022.01); *B23K 26/0006* (2013.01);
(Continued)

(58) Field of Classification Search
CPC ............................ C22C 30/00; B23K 2103/04
See application file for complete search history.

(56) References Cited

U.S. PATENT DOCUMENTS

2013/0059074 A1* 3/2013 Xu ........................... B22F 1/16
427/213

FOREIGN PATENT DOCUMENTS

| CN | 103290404 A | * | 9/2013 | |
| CN | 106086580 A | * | 11/2016 | ............. C23C 30/00 |

(Continued)

OTHER PUBLICATIONS

Stepanov, N. D., et al. "Effect of carbon content and annealing on structure and hardness of the CoCrFeNiMn-based high entropy alloys." Journal of Alloys and Compounds 687 (2016): 59-71. (Year: 2016).*

(Continued)

*Primary Examiner* — Sally A Merkling
*Assistant Examiner* — Sean P. O'Keefe
(74) *Attorney, Agent, or Firm* — Ohlandt, Greeley and Perle, LLP

(57) ABSTRACT

The present disclosure discloses a high-entropy alloy powder for laser cladding and a use method thereof. The alloy powder is $CoCrFeMnNiC_x$, and x has a value of 0.1-0.15. The specific method includes: subjecting a 45 steel substrate to surface pretreatment, mixing the weighed CoCrFeMnNi high-entropy alloy powder with different content of a nano-C powder uniformly and pre-placed on the pre-treated substrate surface to form a prefabricated layer, then placing the prefabricated layer at 80-90° C. for constant temperature treatment for 8-12 h, and under a protective atmosphere, subjecting the cladding powder to laser cladding on the surface of the 45 steel. The method of the present disclosure prepares a $CoCrFeMnNiC_x$ high-entropy alloy coating with performance superior to the CoCrFeMnNi high-entropy alloy coating.

3 Claims, 3 Drawing Sheets

(51) Int. Cl.
*C23C 24/10* (2006.01)
*B23K 26/34* (2014.01)
*C22C 30/00* (2006.01)
*B23K 26/60* (2014.01)
*B23K 26/00* (2014.01)

(52) U.S. Cl.
CPC .............. *B23K 26/34* (2013.01); *B23K 26/60* (2015.10); *C22C 30/00* (2013.01); *C23C 24/103* (2013.01); *C23C 24/106* (2013.01); *B22F 2301/15* (2013.01)

(56) References Cited

FOREIGN PATENT DOCUMENTS

| CN | 106425097 A | * | 2/2017 | ........... B23K 26/082 |
|---|---|---|---|---|
| CN | 107299342 A | * | 10/2017 | ............. C23C 30/00 |
| CN | 108103494 A | * | 6/2018 | ............. C23C 30/00 |
| CN | 108213422 A | * | 6/2018 | |
| CN | 110257682 A | * | 9/2019 | |

OTHER PUBLICATIONS

Li, Jianbo, et al. "Microstructures and mechanical properties of nano carbides reinforced CoCrFeMnNi high entropy alloys." Journal of Alloys and Compounds 792 (2019): 170-179. (Year: 2019).*

* cited by examiner

HIGH ENTROPY ALLOY POWDER FOR LASER CLADDING AND APPLICATION METHOD THEREOF

CROSS REFERENCE TO RELATED APPLICATION

This patent application claims the benefit and priority of Chinese Patent Application No. 202011052429.7 filed on Sep. 29, 2020, the disclosure of which is incorporated by reference herein in its entirety as part of the present application.

TECHNICAL FIELD

The present disclosure relates to a high-entropy alloy powder for laser cladding and a use method thereof, and belongs to the field of laser surface modification.

BACKGROUND ART 45 steel is widely used in various important structural parts in mechanical manufacturing, especially in common parts such as connecting rods, bolts, gears and shafts that work under alternating loads, and has good comprehensive mechanical properties after modulation treatments. However, with the increasing requirements of modern production technology for the performance of some main parts, the hardness, wear resistance and corrosion resistance of the surface of 45 steel are far from meeting needs.

High-entropy alloys are alloys containing multiple main elements, and the number of alloying elements is $n \geq 5$. Unlike traditional alloys that use one or two elements as main components, the high-entropy alloys are new types of alloys obtained by mixing multiple elements at equimolar or nearly equimolar, and the content of each element is much greater than 5% but not more than 35%. Due to the high entropy effect, the high-entropy alloys have a series of excellent properties, such as: high hardness, high wear resistance, high corrosion resistance, high electrical resistivity, etc. The good properties of the equiatomic CoCrFeMnNi high-entropy alloy with a single face-centered cubic (fcc) phase structure include strain hardening, which will lead to very high tensile elongation and unusual fracture toughness even at low temperatures. However, the CoCrFeMnNi high-entropy alloy material still has certain limitations in terms of hardness and strength, and cannot meet the increasingly complex and harsh working environment.

Laser beam has a high power density and a high cooling speed of molten pool, and a non-equilibrium solidification structure can be obtained; the heat input is small, and the heat affecting zone of the substrate is small; the degree of automation is high, and the three-dimensional self-processing and complex surface processing can be realized; the interface is bound metallurgically, with high bonding strength; the high temperature of the melting pool allows processing of high melting point materials; the thickness range of the cladding layer is wide, and the thickness of a single coating can be flexibly adjusted from 0.2 to 2.0 mm; cladding in selected areas is allowed, with low material consumption and excellent performance-to-price ratio. Therefore, the present disclosure employs a laser cladding method to clad the surface of 45 steel with a $CoCrFeMnNiC_x$ high-entropy alloy material coating.

SUMMARY

An object of the present disclosure is to provide a high-entropy alloy powder for laser cladding, wherein the alloy powder is $CoCrFeMnNiC_x$, and x has a value of 0.1 to 0.15.

Another object of the present disclosure is to provide a method for preparing a laser cladding coating with the high-entropy alloy powder, which specifically comprises the following steps:

(1) subjecting a 45 steel substrate to surface pretreatment: sanding, cleaning, and drying for use;

(2) weighing a CoCrFeMnNi high-entropy alloy powder with an equal atomic ratio and a nano-C powder in proportion, and mixing mechanically after weighing;

(3) blending the mixed powders with absolute ethanol to prepare a paste, using a mold to bond the paste to a predetermined position on the steel substrate to obtain a prefabricated coating followed by drying, and subjecting a cladding powder to laser cladding on the surface of the 45 steel in a protective atmosphere.

In some embodiments, in step (2) of the present disclosure, the CoCrFeMnNi high-entropy alloy powder has an average particle size of less than 25 μm, and a powder purity of no less than 99.9%; the nano-C powder has an average particle size of 30 nm to 50 nm, and a purity of no less than 99.99%.

In some embodiments, in step (3) of the present disclosure, the drying is under the following conditions: the prefabricated coating has a thickness of 0.2 mm to 2 mm, and is treated at a constant temperature of 80 to 90° C. for 8 to 12 h.

In some embodiments, in step (3) of the present disclosure, the laser cladding is performed by a $CO_2$ laser, and specific conditions are as follows: a laser power is 3.7 to 4.2 kW, a scanning speed is 200 to 450 mm/min, a spot diameter is 3.0 to 4.0 mm, the protective atmosphere is nitrogen, argon or a mixture of both, a gas flow is 15 to 35 L/min, and a pressure of the protective atmosphere is 0.80 MPa to 1.20 MPa.

The principle of the present disclosure is as follows: the good properties of the equiatomic CoCrFeMnNi high-entropy alloy with a single face-centered cubic (fcc) phase structure includes strain hardening, which can lead to very high tensile elongation and unusual fracture toughness even under low temperature conditions. However, the CoCrFeMnNi high-entropy alloy material still has certain limitations in terms of hardness and strength, and cannot meet the increasingly complex and harsh working environment. In the present disclosure, the addition of nano-C powder reduces the stacking fault energy of the CoCrFeMnNi high-entropy alloy, increases the friction stress between layers, and leads to the plane sliding at room temperature, further improving the strength of the coating material.

The present disclosure has the following beneficial effects:

(1) The laser cladding method has the advantages of high beam energy density and high heating and cooling speed; therefore, the laser cladding structure is a kind of rapid solidification structure, which is conducive to obtaining good performance; in addition, the laser cladding coating is metallurgically bonded with the substrate material, which makes the bonding between the coating and the substrate relatively tight.

(2) The cladding material used in the present disclosure is a CoCrFeMnNi high-entropy alloy powder, which has, compared with other elemental and compound materials, less diffusion of elements after cladding, ensuring that the coating material does not contain a large amount of other non-CoCrFeMnNi phases. At the same time, the nano-C powder is added to the CoCrFeMnNi high-entropy alloy powder to improve the strength of the coating material.

(3) The coating prepared by the laser cladding technology of the present disclosure has good macroscopic morphology, with no obvious defects such as pores and cracks, low dilution rate and tight metallurgical bonding of interfaces; the coating of the CoCrFeMnNi high-entropy alloy prepared in the present disclosure has relatively high hardness, wear resistance and corrosion resistance.

DETAILED DESCRIPTION OF THE EMBODIMENTS

Figure 1:
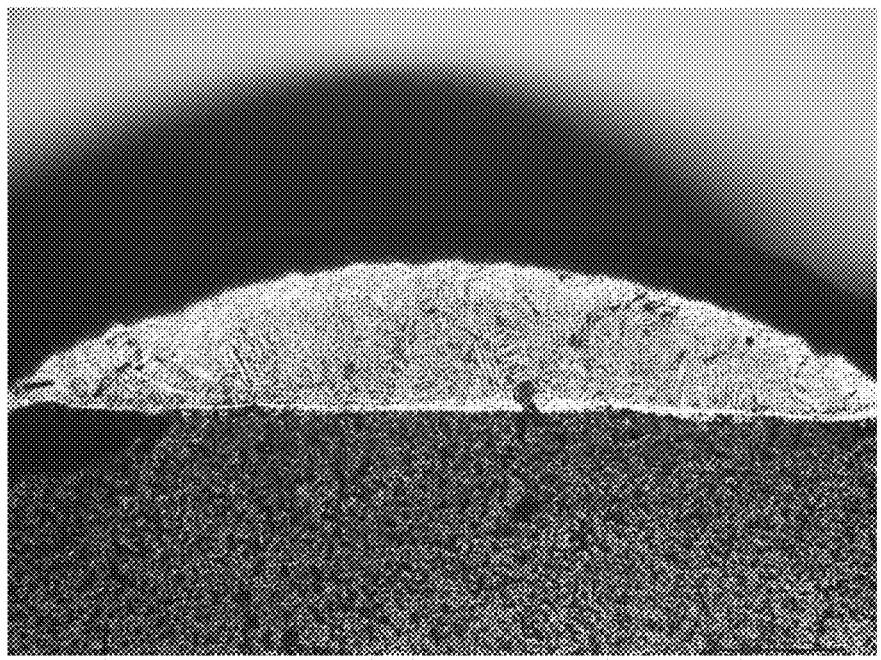
FIG. 1 shows a metallographic structure of the cross-section of the laser cladding coating in Example 1 of the present disclosure.

The present disclosure will be further illustrated below with reference to the embodiments. However, the protection scope of the present disclosure is not limited to the embodiments.

The chemical composition of the substrate material 45 steel in Examples 1 to 3 of the present disclosure is shown in Table 1:

TABLE 1

| Chemical composition of 45 steel | | | | | | | |
| --- | --- | --- | --- | --- | --- | --- | --- |
| Element | C | Si | Mn | Cr | Ni | Cu | Fe |
| Mass fraction % | 0.42~0.50 | 0.17~0.37 | 0.50~0.80 | ≤0.25 | ≤0.30 | ≤0.25 | Balance |

Example 1

A process for preparing a laser cladding layer with the high-entropy alloy powder was performed, which specifically included the following steps:

(1) Surface pretreatment of a 45 steel substrate: the surface of the metal substrate was firstly sanded with a 200-800 mesh sandpaper to remove the oxide film and rinsed with water, and then was subjected to ultrasonic cleaning in absolute ethanol to remove residual oil and impurities on the surface; after cleaning, the metal substrate was dried in a vacuum environment at 60° C. for 0.5 h for use; the sanding required complete removal of the oxide film on the surface of the metal substrate without coarse scratches, and sanding marks in a consistent direction and a bright surface.

(2) a CoCrFeMnNi high-entropy alloy powder and a nano-C powder were weighed according to the atomic ratio of CoCrFeMnNiC$_{0.1}$, and were mechanically mixed after weighing, wherein the nano-C powder had an average particle size of 50 nm and a purity of no less than 99.99%.

(3) The weighed mixed powders were blended with absolute ethanol with a purity of no less than 99.7% to prepare a paste, and a mold was used to bond the paste to a predetermined position on the 45 steel substrate to obtain a prefabricated coating with a thickness of 1 mm, which was then placed at 90° C. for a constant temperature treatment for 10 hours; the cladding powder was subjected to laser cladding on the surface of the 45 steel under a protective atmosphere to obtain a cladding coating composed of cladding points distributed in an array; the laser cladding was performed by a CO$_2$ laser, wherein the laser power was 4.2 kW, the scanning speed was 450 mm/min, the spot diameter was 3 mm, the protective atmosphere was a mixed gas of Ar and N$_2$, the gas flow was 25 L/min, and the pressure of the protective atmosphere was 1.20 MPa.

A D/max-3BX type X-ray diffractometer was used to characterize the CoCrFeMnNiC$_{0.1}$ high-entropy alloy coating in this example with an object image; the result shows that the object image is mainly composed of FCC phase.

The microhardness of the cladding layer was measured by using a HVS-1000A type microhardness tester, the pressure was 0.2 kg, and the hardness of the coating and the metal substrate was measured after 15 s of holding pressure. From calculation, the average microhardness of the 45 steel substrate is 163.4 HV$_{0.2}$, and the average hardness of the CoCrFeMnNi high-entropy alloy coating is 211.2 HV$_{0.2}$, which is 1.29 times that of the metal substrate.

Figure 2:
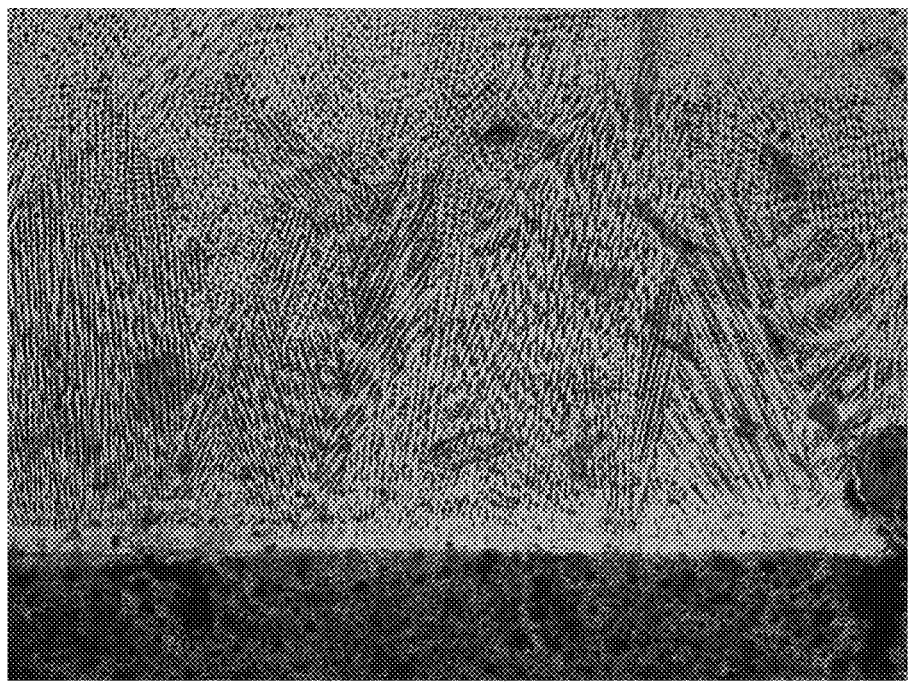
FIG. 2 shows a metallographic structure of the bonding zone of the laser cladding coating in Example 1 of the present disclosure.
Figure 3:
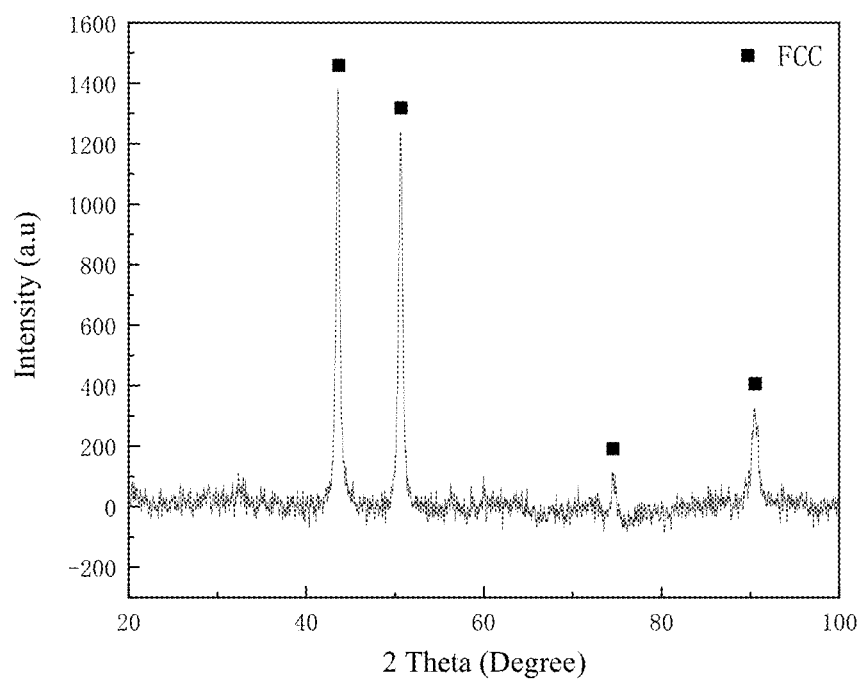
FIG. 3 shows an XRD spectrum of the laser cladding coating of Example 1 of the present disclosure.

The coating was corroded with aqua regia, and the metallographic photos of the cladding layer were obtained with a Leica DFC280 vertical metallurgical microscope, as shown in FIG. 1 and FIG. 2. It may be seen from the figures that the cladding layer is well bonded without obvious cracks or pores and has a dense structure. The D/max-3BX type X-ray diffractometer was used to characterize the CoCrFeMnNiC$_{0.1}$ high-entropy alloy material coating with an object image; the result shows, as shown in FIG. 3, that it is mainly composed of FCC phase.

Example 2

The process for preparing a laser cladding layer with the high-entropy alloy powder in this example specifically included the following steps:

(1) Pretreatment of a substrate: the surface of the metal substrate was firstly sanded with a 200-800 mesh sandpaper and rinsed with water, and then was ultrasonically cleaned in absolute ethanol and dried in a vacuum environment at 80° C. for 0.5 h for use. The sanding required complete removal of the oxide film on the surface of the metal substrate without large scratches, and sanding marks in a consistent direction and a bright surface.

(2) A CoCrFeMnNi high-entropy alloy powder and a nano-C powder were weighted according to the atomic ratio of CoCrFeMnNiC$_{0.15}$, and mechanically mixed after weighing, wherein the nano-C powder had an average particle size of 30 nm and a purity of no less than 99.99%.

(3) The mixed powders were blended with anhydrous ethanol with a purity of no less than 99.7% to prepare a paste, and a mold was used to bond the paste to a predetermined position on the 45 steel substrate to obtain a prefabricated coating with a thickness of 1 mm, which was then placed at 85° C. for a constant temperature treatment for 8 hours; under a protective atmosphere, the cladding powder was subjected to laser cladding on the surface of the 45 steel to obtain a cladding coating composed of cladding points distributed in an array; the laser cladding was performed by a $CO_2$ laser, wherein the laser power was 3.7 kW, the scanning speed was 200 mm/min, the spot diameter was 4 mm, the protective gas was $N_2$, the gas flow was 20 L/min, and the pressure of the protective atmosphere was 1.10 MPa.

A D/max-3BX type X-ray diffractometer was used to characterize the $CoCrFeMnNiC_{0.15}$ high-entropy alloy coating with an object image; the result shows that the object image is mainly composed of FCC phase.

The microhardness of the cladding layer was measured by using a HVS-1000A type microhardness tester, the pressure was 0.2 kg, and the hardness of the coating and the metal substrate was measured after 15 s of holding pressure. From calculation, the average microhardness of the 45 steel substrate is 160.8 $HV_{0.2}$, and the average hardness of the $CoCrFeMnNiC_{0.15}$ high-entropy alloy coating is 203.3 $HV_{0.2}$, which is 1.26 times that of the metal substrate.

Comparative Example 1

A process for preparing a laser cladding coating with the high-entropy alloy powder was performed, which specifically included the following steps:

(1) Surface pretreatment of a 45 steel substrate: the surface of the metal substrate was firstly sanded with a 200-800 mesh sandpaper to remove the oxide film and rinsed with water, and was then subjected to ultrasonic cleaning in absolute ethanol to remove residual oil and impurities on the surface; after cleaning, the metal substrate was dried for 1 hour in a vacuum environment at 70° C. for use; the sanding required complete removal of the oxide film on the surface of the metal substrate without coarse scratches, and sanding marks in a consistent direction and a bright surface.

(2) A CoCrFeMnNi high-entropy alloy powder was weighted. The weighed CoCrFeMnNi high-entropy alloy powder was blended with absolute ethanol with a purity of no less than 99.7% to prepare a paste, and a mold was used to bond the paste to a predetermined position of the 45 steel substrate to obtain a prefabricated coating with a thickness of 1 mm, which was then placed at 80° C. for a constant temperature treatment for 8 hours; under a protective atmosphere, the cladding powder was subjected to laser cladding on the surface of the 45 steel to obtain a cladding coating composed of cladding points distributed in an array; the laser cladding was performed by a $CO_2$ laser, wherein the laser power was 3.7 kW, the scanning speed was 200 mm/min, the spot diameter was 3 mm, the protective gas was Ar, the gas flow was 15 L/min, and the pressure of the protective atmosphere was 1.00 MPa.

Figure 4:
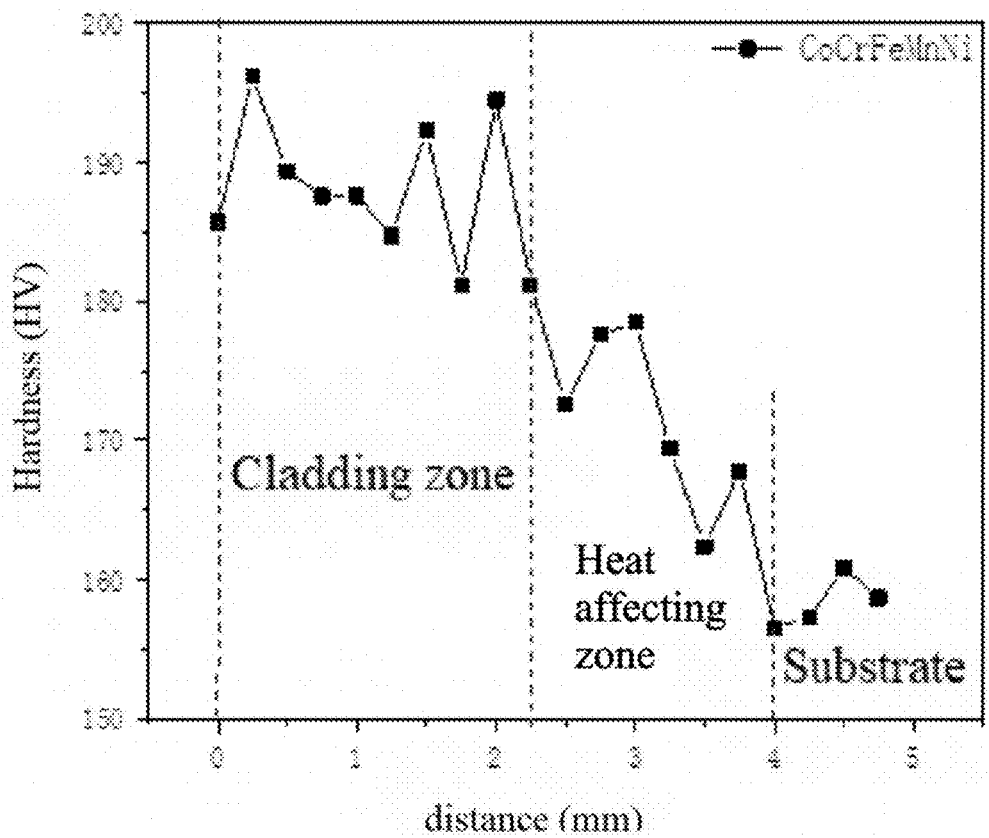
FIG. 4 shows microhardness of the cladding coating and the substrate in Example 1 of the present disclosure.

The microhardness of the cladding layer was measured by using a HVS-1000A type microhardness tester, the pressure was 0.2 kg, and the hardness of the coating and the metal substrate was measured after 15 s of holding pressure, with the result shown in FIG. 4. From calculation, the average microhardness of the 45 steel substrate is 158.4 $HV_{0.2}$, and the average hardness of the CoCrFeMnNi high-entropy alloy coating is 188.1 $HV_{0.2}$, which is 1.19 times that of the metal substrate.

In summary, a D/max-3BX type X-ray diffractometer was used to characterize the $CoCrFeMnNiC_x$ high-entropy alloy coatings with object images; the results show that the object images of the cladding coatings in Example 1, Example 2 and Comparative Example 1 are all mainly composed of FCC phase. The microhardness of the cladding layers were measured by using a HVS-1000A type microhardness tester, the pressure was 0.2 kg, and the hardness of the coatings and the metal substrates was measured after 15 s of holding pressure. The hardness of the cladding coatings are significantly improved in Example 1, Example 2 and Comparative Example 1 compared with that of the substrates, with the coating hardness of Example 1>Example 2>Comparative Example 1. Thus, it can be seen that with the increase in C atoms, the strength of the alloy is firstly increased and then decreased. Nevertheless, compared with the CoCrFeMnNi high-entropy alloy coating in Comparative Example 1, the strength of the $CoCrFeMnNiC_{0.1}$ high-entropy alloy coating in Example 1 and the $CoCrFeMnNiC_{0.15}$ high-entropy alloy coating in Example 2 are both significantly improved.

What is claimed is:

1. A method for preparing a laser cladding coating with a high-entropy alloy powder, the high-entropy alloy powder being $CoCrFeMnNiC_x$, wherein x has a value of 0.1 to 0.15, and,
   the method comprising the following steps:
   (1) subjecting a surface of a 45 steel substrate to surface pretreatment: sanding, cleaning, and drying for use;
   (2) weighing a CoCrFeMnNi high-entropy alloy powder with an equal atomic ratio and a nano-C powder in proportion, and mixing mechanically after weighing;
   (3) blending the mixed powders with absolute ethanol to prepare a paste, using a mold to bond the paste to a predetermined position on the steel substrate to obtain a prefabricated coating followed by drying to obtain a dried prefabricated coating, and subjecting the dried prefabricated coating to laser cladding in a protective atmosphere to obtain the laser cladding coating;
   wherein in step (3), the laser cladding is performed by a $CO_2$ laser, and specific conditions are as follows: a laser power is 3.7 to 4.2 kW, a scanning speed is 200 to 45 mm/min, a spot diameter is 3.0 to 4.0 mm, the protective atmosphere is nitrogen, argon or a mixture of both, a gas flow is 15 to 35 L/min, and a pressure of the protective atmosphere is 0.80 MPa to 1.20 MPa.

2. The method according to claim 1, wherein in step (2), the CoCrFeMnNi high-entropy alloy powder has an average particle size of less than 25 μm, and a powder purity of no less than 99.9%; the nano-C powder has an average particle size of 30 nm to 50 nm, and a purity of no less than 99.99%.

3. The method according to claim 1, wherein in step (3), the drying is under the following conditions: the prefabricated coating has a thickness of 0.2 mm to 2 mm, and is treated at a constant temperature of 80 to 90° C. for 8 to 12 h.

* * * * *